United States Patent
Song et al.

(10) Patent No.: US 9,007,228 B2
(45) Date of Patent: Apr. 14, 2015

(54) TRANSMISSION SYSTEM USING DYING GASP

(71) Applicants: Dong Il Song, Gyeonggi-do (KR); Min-kyu Cho, Seoul (KR)

(72) Inventors: Dong Il Song, Gyeonggi-do (KR); Min-kyu Cho, Seoul (KR)

(73) Assignee: UBIQUOSS Inc., Seoul (KR)

( * ) Notice: Subject to any disclaimer, the term of this patent is extended or adjusted under 35 U.S.C. 154(b) by 140 days.

(21) Appl. No.: 13/933,931

(22) Filed: Jul. 2, 2013

(65) Prior Publication Data

US 2014/0009298 A1    Jan. 9, 2014

(30) Foreign Application Priority Data

Jul. 3, 2012    (KR) .................... 10-2012-0072421

(51) Int. Cl.
| | |
|---|---|
| G08B 21/00 | (2006.01) |
| *G08B 21/18* | (2006.01) |
| *H04Q 11/00* | (2006.01) |
| H04B 17/00 | (2006.01) |
| H04J 14/00 | (2006.01) |

(52) U.S. Cl.
CPC .............. *G08B 21/185* (2013.01); *H04Q 11/00* (2013.01)

(58) Field of Classification Search
USPC .............. 340/657; 398/22, 72, 66, 17, 38, 58
See application file for complete search history.

(56) References Cited

U.S. PATENT DOCUMENTS

| | | | | |
|---|---|---|---|---|
| 5,523,868 | A * | 6/1996 | Hawley | 398/38 |
| 8,818,192 | B1 * | 8/2014 | Smith et al. | 398/72 |
| 2008/0195881 | A1 * | 8/2008 | Bernard et al. | 713/340 |
| 2008/0304825 | A1 * | 12/2008 | Mahony et al. | 398/38 |
| 2009/0074411 | A1 * | 3/2009 | Bernard et al. | 398/58 |
| 2010/0150556 | A1 * | 6/2010 | Soto et al. | 398/66 |
| 2010/0215359 | A1 * | 8/2010 | Li et al. | 398/22 |
| 2010/0272433 | A1 * | 10/2010 | Shaffer et al. | 398/17 |
| 2014/0009298 | A1 * | 1/2014 | Song et al. | 340/657 |

* cited by examiner

*Primary Examiner* — Jack K Wang
(74) *Attorney, Agent, or Firm* — Reinhart Boerner Van Deuren P.C.

(57) ABSTRACT

An Ethernet-based transmission system using a dying gasp according to the present invention includes an SMPS for supplying power to an Ethernet-based lower level system, detecting a state of a power fault, and outputting a dying gasp alarm signal. A CPU receives the dying gasp alarm signal, and generates and transmits an alarm packet. A PHY chip receives the alarm packet, and uplinks the alarm packet so that the alarm packet is transferred to a higher level stage. An L3 switch receives the alarm packet and determines whether a power fault has occurred in the lower level system. Accordingly, the present invention applies a dying gasp to an Ethernet-based or EPON-based transmission system and is then capable of generating and transmitting an alarm packet so that when a power fault occurs, a device in a higher level network can rapidly determine the occurrence of the power fault.

13 Claims, 6 Drawing Sheets

TRANSMISSION SYSTEM USING DYING GASP

BACKGROUND OF THE INVENTION

1. Field of the Invention

The present invention relates, in general, to a transmission system using a dying gasp and, more particularly, to a transmission system using a dying gasp, which applies a dying gasp to an Ethernet-based or Ethernet Passive Optical Network (EPON)-based system, and is then capable of generating and transmitting an alarm packet so that when a power failure or a power fault occurs, a device in a higher level network can rapidly determine whether a power fault has occurred in a lower level network.

2. Description of the Related Art

Recently, as the number of Internet users who use wireless communication has rapidly increased, high-speed Internet technologies have been developed so as to provide higher-speed Internet services to users.

Representative technology for such a typical high-speed Internet service is wireless Local Area Network (WLAN) technology.

Optical communication systems are systems for transmitting and receiving data based on optical signals. An optical line terminal on a station side is a device for relaying the transmission of data between a server for providing various types of data services to subscribers over a telephone network or the Internet and optical network terminals connected to the respective subscriber terminals. The optical line terminal forms optical signals required to transmit transmission data from the server to a target optical network terminal, and to receive transmission data from the target optical network terminal.

Generally, the Ethernet is the most widely used Local Area Network (LAN) technology. An Ethernet switch system is provided with a plurality of switch systems and configured to allocate a transfer rate of several tens to several hundreds of Mbps (megabit per second) to each Ethernet, thus enabling high-speed data transmission. Such an Ethernet switch system includes a switch chip for performing a switch operation, a physical layer (PHY) chip directly connected to the switch chip, a Central Processing Unit (CPU) processor for controlling the entirety of the Ethernet switch system, and a media interface connected to an external network through the PHY chip.

The PHY chip has therein a register set conforming to international standards and provides various types of information through the switch chip at a higher level. Generally, provided information is related to the link, duplex, traffic, speed, error occurrence, and state of media. The CPU processor controls the Ethernet switch system using previously programmed software, and monitors the connection state of an external network connected to the media interface.

Further, a Passive Optical Network (PON) is one of optical subscriber construction schemes for providing an optical fiber-based high-speed service to businesses or normal homes, and is configured such that Optical Network Terminals (ONTs) disposed downstream of the splitter can be connected to the PON by using a splitter in an optical cable.

However, a problem arises in that, upon determining whether a power fault has occurred either in a communication terminal connected to the Ethernet or in each system of a lower level network connected to an EPON-based network, it is impossible to rapidly process such a determination due to interworking with a higher level network.

SUMMARY OF THE INVENTION

Accordingly, the present invention has been made keeping in mind the above problems occurring in the prior art, and an object of the present invention is to provide a transmission system using a dying gasp, which applies a dying gasp to an Ethernet-based or EPON-based transmission system, and is then capable of generating and transmitting an alarm packet so that when a power failure or a power fault occurs, a device in a higher level network can rapidly determine whether a power fault has occurred in a lower level network.

Technical objects of the present invention are not limited to the above-described objects, and other objects that are not described here will be more clearly understood by those skilled in the art from the following detailed description taken in conjunction with the accompanying drawings.

In order to accomplish the above objects, the present invention provides a transmission system using a dying gasp, the transmission system being implemented for a communication terminal connected over an Ethernet, including a Switching Mode Power Supply (SMPS) for supplying power to an Ethernet-based lower level system, detecting a state of a power fault, and outputting a dying gasp alarm signal; a Central Processing Unit (CPU) for receiving the dying gasp alarm signal from the SMPS, and generating and transmitting an alarm packet; a Physical layer (PHY) chip for receiving the alarm packet from the CPU, and uplinking the alarm packet so that the alarm packet is transferred to a higher level stage; and a Layer-3 (L3) switch for receiving the alarm packet from the PHY chip and determining whether a power fault has occurred in the lower level system.

Preferably, the SMPS may be provided with a photodiode and may be configured to, when a voltage of the SMPS drops below a set voltage, stably turn on the photodiode and output the dying gasp alarm signal by isolating the received signal.

Further, the present invention provides a transmission system using a dying gasp, the transmission system being implemented for a communication terminal connected to an Ethernet, including an SMPS for supplying power to an Ethernet-based lower level system; a dying gasp detection unit for receiving a voltage of the SMPS, comparing the received voltage with a reference voltage, and outputting a dying gasp alarm signal if it is determined that a power fault has occurred; a CPU for receiving the dying gasp alarm signal from the dying gasp detection unit, and generating and transmitting an alarm packet; a PHY chip for receiving the alarm packet from the CPU, and uplinking the alarm packet so that the alarm packet is transferred to a higher level stage; and an L3 switch for receiving the alarm packet from the PHY chip and determining whether a power fault has occurred in the lower level system.

Preferably, the CPU may include an interrupt processing unit for generating an interrupt signal making a transition from a high level of a normal signal to a low level when the dying gasp alarm signal is received; a control unit for assigning priority to the interrupt signal generated by the interrupt processing unit, and outputting an alarm signal; and an alarm packet unit for receiving the alarm signal from the control unit and generating and transmitting an alarm packet corresponding to the alarm signal.

Preferably, the alarm packet unit may generate an Ethernet Operations, Administration and Maintenance (OAM) packet, a Simple Network Management Protocol (SNMP) packet, and a Syslog packet, and transmit the packets to the uplink PHY chip operating in conjunction with the higher-level network.

Furthermore, the present invention provides a transmission system using a dying gasp, the transmission system being an Ethernet Passive Optical Network (EPON)-based transmission system, including an SMPS for supplying power to an EPON-based lower level system, detecting a state of a power fault, and outputting a dying gasp alarm signal; a Complex Programmable Logic Device (CPLD) for receiving the dying gasp alarm signal from the SMPS and transferring the dying gasp alarm signal; a Media Access Control (MAC) chip for receiving the dying gasp alarm signal from the CPLD, and generating an alarm packet; and an EPON Optical Line Terminal (EPON OLT) for receiving the alarm packet from the MAC chip and determining whether a power fault has occurred in the lower level system.

Preferably, the SMPS may be provided with a photodiode and may be configured to, when a voltage of the SMPS drops below a set voltage, turn on the photodiode and output the dying gasp alarm signal.

Furthermore, the present invention provides a transmission system using a dying gasp, the transmission system being an Ethernet Passive Optical Network (EPON)-based transmission system, including an SMPS for supplying power to an EPON-based lower level system; a dying gasp detection unit for receiving a voltage of the SMPS, comparing the received voltage with a reference voltage, and outputting a dying gasp alarm signal if it is determined that a power fault has occurred; a CPLD for receiving the gasp alarm signal from the dying gasp detection unit and transferring the dying gasp alarm signal; a MAC chip for receiving the dying gasp alarm signal from the CPLD and generating an alarm packet; and an EPON OLT for receiving the alarm packet from the MAC chip and determining whether a power fault has occurred in the lower level system.

Preferably, the MAC chip may receive the dying gasp alarm signal through a power fail pin and then detect whether a power fault has occurred.

Preferably, the CPLD may bypass the dying gasp alarm signal to the MAC chip and invert a dying gasp alarm signal of "0" or "1" depending on a condition of the MAC chip, or may transfer the dying gasp alarm signal to the MAC chip in combination with other conditions.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
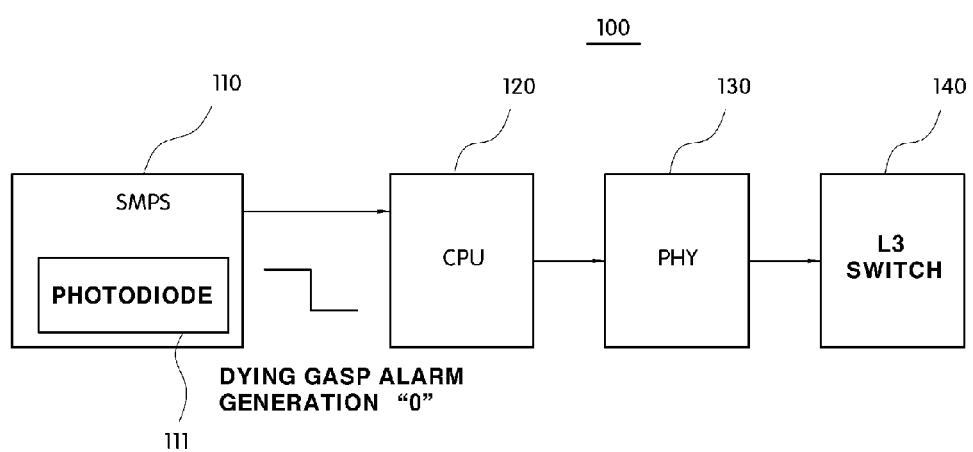
FIG. 1 is a diagram schematically showing an Ethernet-based transmission system using a dying gasp according to a first embodiment of the present invention.

Hereinafter, embodiments of the present invention that can be easily implemented by those skilled in the art will be described in detail with reference to the attached drawings. Further, if, in the description the principles of the operation of preferred embodiments, detailed descriptions of well-known functions or configurations may unnecessarily make the gist of the present invention obscure, the detailed descriptions will be omitted.

The same reference numerals are used throughout the different drawings to designate components performing the same or similar functions and operations.

Throughout the entire specification, a representation indicating that a first part is "connected" to a second part includes the case where the first part is "indirectly connected" to the second part with some other element interposed therebetween, as well as the case where the first part is "directly connected" to the second part. Further, a representation indicting that a certain part "includes" a certain element means that other elements may be further included in the certain part without excluding other elements unless a description to the contrary is specifically pointed out.

Hereinafter, embodiments of the present invention will be described in detail with reference to the attached drawings.

FIG. 1 is a diagram schematically showing the configuration of an Ethernet-based transmission system using a dying gasp according to an embodiment of the present invention. As shown in FIG. 1, an Ethernet-based transmission system 100 using a dying gasp according to the present invention is implemented as a transmission system for a communication terminal connected over the Ethernet. The Ethernet-based transmission system 100 includes a Switching-Mode Power Supply (SMPS) 110, a Central Processing Unit (CPU) 120, a physical layer (PHY) chip 130, and a Layer-3 (L3) switch 140. The SMPS 110 supplies power to an Ethernet-based lower level system, detects the state of a power fault, and outputs a dying gasp alarm signal. The CPU 120 receives the dying gasp alarm signal from the SMPS 110, and generates and transmits an alarm packet. The PHY chip 130 receives the alarm packet from the CPU 120, and uplinks the alarm packet so that it is transferred to a higher level stage. The L3 switch 140 receives the alarm packet from the PHY chip 130, and determines whether a power fault has occurred in the lower level system.

The SMPS 110 is a switching mode power supply and is the power supply unit of a communication terminal in a lower level network connected to the Ethernet. Such an SMPS 110 is provided with a photodiode 111 and configured to safely isolate a power fault operation signal and transfer a state. That is, a detection unit is implemented in the SMPS 110 using a passive element in accordance with a set voltage, and is configured to, if the voltage of the SMPS drops below the set voltage, turn on the photodiode and output a dying gasp alarm signal.

The CPU 120 receives the dying gasp alarm signal from the SMPS 110, generates an alarm packet, and transmits the alarm packet to the PHY chip 130 which operates in conjunction with the higher level network.

In more detail, when the generation of a dying gasp alarm signal is recognized, the CPU 120 generates and transmits an alarm packet. In this case, since the CPU 120 must process the generation and transmission of the alarm packet within a running time, the highest possible speed must be guaranteed by implementing packet processing using an interrupt.

The PHY chip 130, together with the CPU 120, operate in conjunction with a higher level network, and may be implemented as an Ethernet PHY board for 10/100/1000B-TX or 1000B-X Ethernet-based uplink.

The L3 switch 140 receives the alarm packet from the PHY chip 130 and then determines the state of a power fault in the lower level network.

Figure 2:
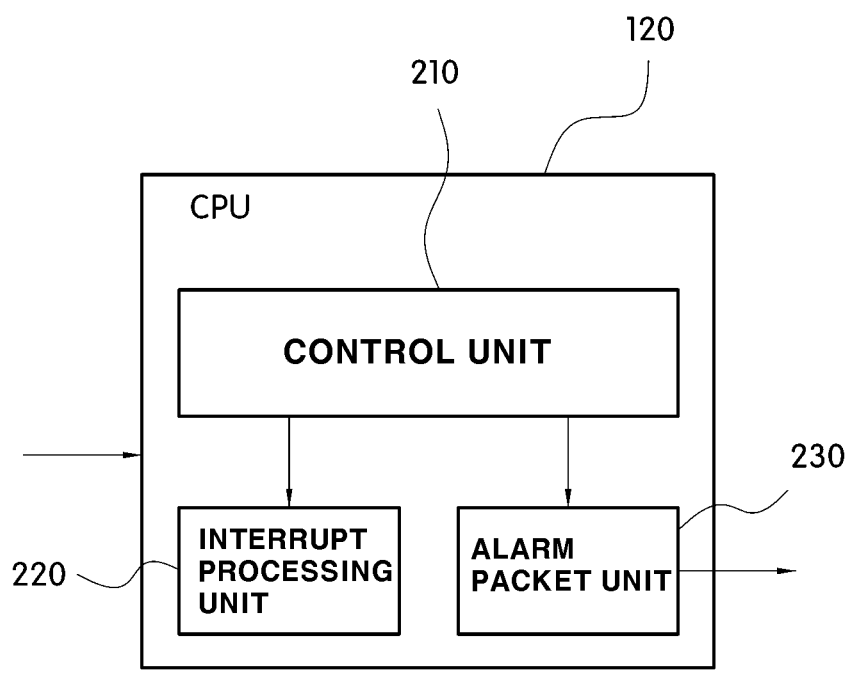
FIG. 2 is a diagram schematically showing the configuration of the CPU of FIG. 1.

Meanwhile, FIG. 2 is a diagram schematically showing the configuration of the CPU of FIG. 1. As shown in FIG. 1, the CPU 120 may include a control unit 210, an interrupt processing unit 220, and an alarm packet unit 230.

The control unit 210 assigns highest priority to the corresponding interrupt (dying gasp interrupt) signal generated by the interrupt processing unit 220 and then operates the alarm packet unit 230. That is, the control unit 210 operates the interrupt processing unit 220 and the alarm packet unit 230, and controls a series of procedures related to the corresponding interrupt signal.

When the dying gasp alarm signal is received, the interrupt processing unit 220 generates an interrupt signal while the level of a signal which is maintained at a high level in a normal operation falls to a lower level.

The alarm packet unit 230 receives an alarm signal from the control unit 210 and generates and transmits a packet corresponding to the alarm signal. That is, when a dying gasp alarm interrupt occurs, the packet is generated and transmitted using the corresponding function. In this case, the alarm packet unit 230 generates an Ethernet Operations, Administration and Maintenance (OAM) packet, a Simple Network Management Protocol (SNMP) packet, and a Syslog packet, and transmits the packets to an uplink port operating in conjunction with the higher level network.

In greater detail, the following Tables show examples of the Ethernet OAM packet, the SNMP packet, and the Syslog packet generated by the alarm packet unit 230.

| <Ethernet OAM packet> | |
|---|---|
| Octets | |
| 6 | 01-80-c2-00-00-02[Slow Protocol] |
| 6 | MAC Source Address |
| 2 | Type = 88-09 [Slow Protocols] |
| 1 | Subtype = 0x03 [OAM] |
| 2 | Flags Field |
| 1 | Code |
| 42-1496 | Code/Pad field |
| 4 | Frame Check Sequence |
| 64-1518 | |

| <SNMP packet> | |
|---|---|
| Octets | |
| 14 | Ethernet Header (type: IP(0x0800)) |
| 20 | IP Header (protocol: UDP) |
| 8 | UDP Header (Source port: xxx, Destination port: 162) |
| 4 | SNMP Version = 1 (v2c) |
| 4 | SNMP Community |
| N | SNMP PDU |
| 64-1518 | |

| <Syslog packet> | |
|---|---|
| Octets | |
| 14 | Ethernet Header (type: IP (0x0800)) |
| 20 | IP Header (protocol: UDP) |
| 8 | UDP Header (Source port: 514, Destination port: 514) |
| 3~5 | PRI part (Facility + Syslog level) |
| N | Header Part (timestamp & hostname) |
| N | Syslog Message |
| ~1024 | Max size |

Further, an operating method based on the embodiment of FIG. 1 is configured to receive a dying gasp alarm signal generated by the SMPS 110 itself, which supplies the power of the system, and to recognize a power fault.

The passive element configured in accordance with the voltage of the SMPS 110 turns on the photodiode when the voltage drops below the set voltage, and then transfers the alarm signal to the CPU 120.

If the dying gasp alarm signal is input through a specific General Purpose Input/Output (GPIO) pin, and the input of the pin makes a transition from a default state to an alarm state, the CPU 120 performs the function of recognizing the transition and generating an alarm packet related to the dying gasp. Here, a power unit must be provided with a sufficient number of capacitors so that the power unit is maintained in an operable state for a predetermined period of time in order to generate a fault signal and allow the CPU to recognize the fault signal and transmit an alarm packet when a fault occurs in the power unit.

Figure 3:
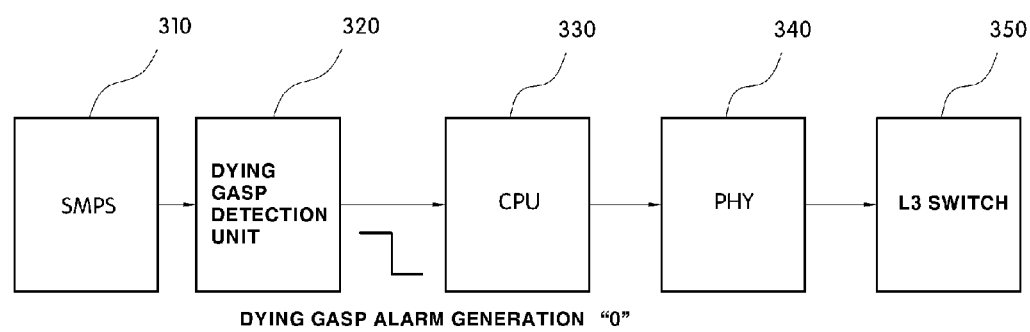
FIG. 3 is a diagram schematically showing an Ethernet-based transmission system using a dying gasp according to a second embodiment of the present invention.

FIG. 3 is a diagram schematically showing the configuration of an Ethernet-based transmission system using a dying gasp according to a second embodiment of the present invention. As shown in FIG. 3, an Ethernet-based transmission system 300 using a dying gasp according to the present invention is implemented as a transmission system for a communication terminal connected over the Ethernet. The Ethernet-based transmission system 300 includes an SMPS 310, a dying gasp detection unit 320, a CPU 330, a PHY chip 340, and an L3 switch 350. The SMPS 310 supplies power to an Ethernet-based lower level system. The dying gasp detection unit 320 receives the voltage of the SMPS 310, compares the received voltage with a reference voltage, and outputs a dying gasp alarm signal if it is determined that a power fault has occurred as a result of the comparison. The CPU 330 receives the dying gasp alarm signal from the dying gasp detection unit 320, and generates and transmits an alarm packet. The PHY chip 340 receives the alarm packet from the CPU, and uplinks the alarm packet so that it is transferred to a higher level stage. The L3 switch 350 receives the alarm packet from the CPU 330 through the PHY chip 340 and determines whether a power fault has occurred in the lower level system.

In this case, a detailed description of the same components as those of the first embodiment will be omitted.

This embodiment corresponds to a case where the SMPS 310 does not support a dying gasp recognition signal, wherein the dying gasp detection unit 320 is separately configured in the main board of the system to implement such a function.

Figure 4:
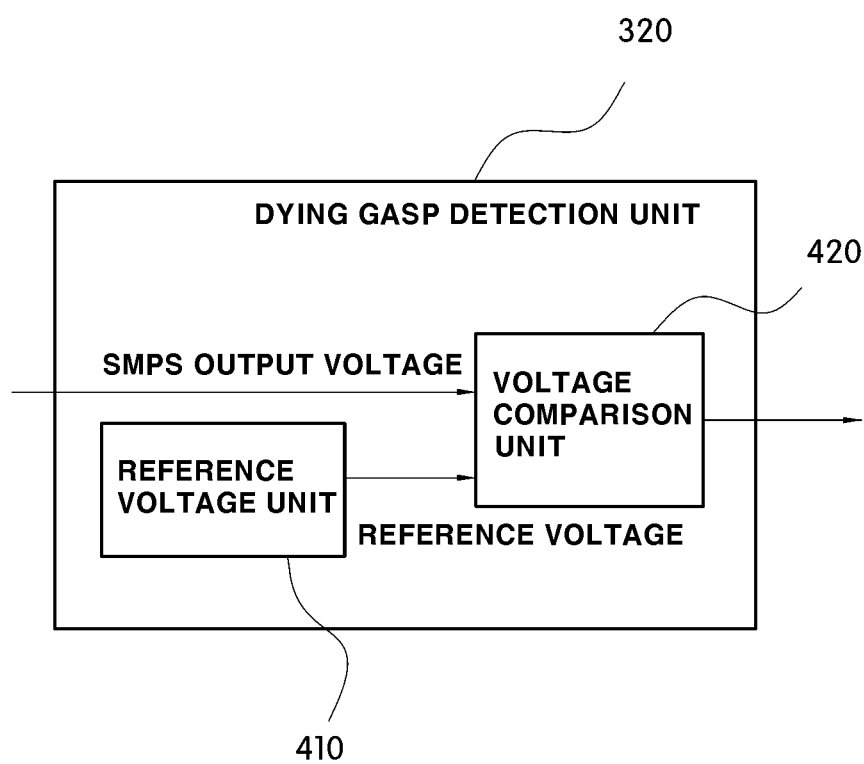
FIG. 4 is a diagram schematically showing the configuration of the dying gasp detection unit of FIG. 3.

FIG. 4 is a diagram schematically showing the configuration of the dying gasp detection unit of FIG. 3. As shown in FIG. 4, in the dying gasp detection unit 320, the comparator logic of a voltage comparison unit 420 is implemented and configured to receive the output voltage of the SMPS and also receive a reference voltage set by a reference voltage unit 410, and to perform monitoring based on a comparison between the output voltage and the reference voltage. When the output voltage of the SMPS drops below the reference voltage while monitoring based on the comparison is being performed, the dying gasp detection unit 320 applies an alarm signal corresponding to such a voltage drop to the CPU.

Figure 5:
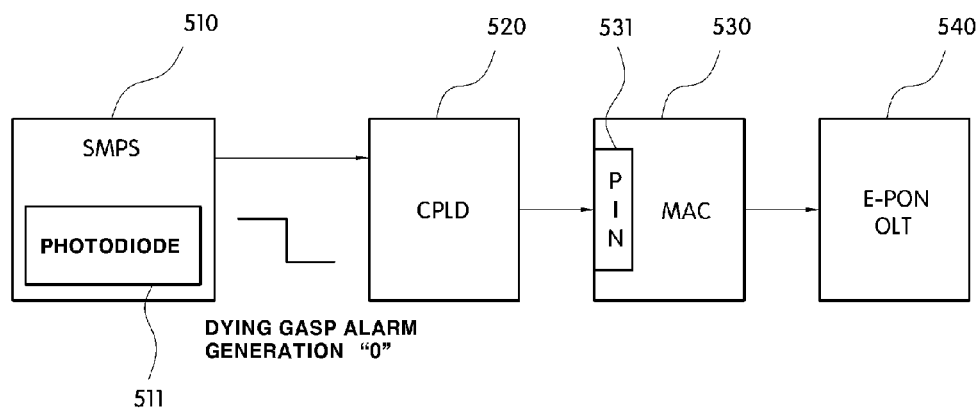
FIG. 5 is a diagram schematically showing the configuration of an Ethernet-based transmission system using a dying gasp according to a third embodiment of the present invention.

FIG. 5 is a diagram schematically showing the configuration of an EPON-based transmission system using a dying gasp according to a third embodiment of the present invention. As shown in FIG. 5, an EPON-based transmission system 500 using a dying gasp according to the present invention includes an SMPS 510, a Complex Programmable Logic Device (CPLD) 520, an EPON Optical Network Unit Media Access Control (EPON ONU MAC) chip 530, and an EPON Optical Line Terminal (OLT) 540. The SMPS 510 supplies power to an EPON-based lower level system, detects the state of a power fault, and outputs a dying gasp alarm signal. The CPLD 520 receives the dying gasp alarm signal from the SMPS 510 and transfers it. The EPON ONU MAC chip 530 receives the dying gasp alarm signal from the CPLD 520, and generates an alarm packet. The EPON OLT 540 receives the alarm packet from the EPON ONU MAC chip 530 and determines whether a power fault has occurred in the lower level system.

The SMPS 510 is a switching mode power supply and is the power supply unit of a communication terminal in a lower level network connected to the Ethernet. Such an SMPS 510 is provided with a photodiode to independently detect the state of power. That is, a detection unit is implemented in the SMPS 510 using a passive element in accordance with a set voltage, and is configured to, if the voltage of the SMPS drops below the set voltage, turn on the photodiode and output a dying gasp alarm signal.

The CPLD 520 may bypass an input signal unchanged and transfer it to the EPON ONU MAC chip 530, may invert a dying gasp alarm signal of "0" or "1" depending on the condition of the EPON ONU MAC chip 530, or may transfer the alarm signal to the EPON ONU MAC chip 530 in combination with other conditions.

The EPON ONU MAC chip 530 receives the dying gasp alarm signal through a power fail pin and then detects whether a power fault has occurred. Here, since the EPON ONU MAC chip is generally implemented using a commercial chip, it is difficult to randomly change the attributes of the power fail pin, and thus the system may be easily implemented in compliance with the attributes of the corresponding pin by employing the CPLD in the system.

Further, even in the structure of the EPON, capacitors must be designed so that sufficient time is maintained in order to allow the EPON ONU MAC chip 530 to recognize an alarm signal and to generate and transmit the corresponding OAM packet.

Here, the EPON ONU MAC chip 530 that has recognized the alarm signal generates and transmits an EPON OAM Packet Data Unit (PDU) having the following structure. Dying gasp information is loaded into a second bit of a flags field in the OAM PDU, and a resulting OAM PDU is transmitted.

| Octets | | |
|---|---|---|
| 6 | Destination Address = 01-80-c2-00-00-02 | Common, fixed header for all OAMPDUs |
| 6 | Source Address | |
| 2 | Length/Type = 88-09 [Slow Protocols] | |
| 1 | Subtype = 0x03 [OAM] | |
| 2 | Flags | |
| 1 | Code | |
| 42-1496 | Data/Pad | |
| 4 | FCS | |

Further, the implementation operation of the first embodiment is described below. Even an EPON-based service structure may receive a dying gasp alarm signal output from the SMPS 510, generate an alarm packet, and transmit the alarm packet to the higher level network. First, when a dying gasp alarm occurs on the SMPS 510, the state of the corresponding pin of the CPLD 520 makes a transition from "1" to "0." The CPLD 520 recognizes such a transition, and transfers the alarm signal to the EPON ONU MAC chip 530. The EPON ONU MAC chip 530 receives it through a power fail pin, detects whether a fault has occurred, and generates and transmits an alarm packet corresponding to the results of the detection.

Figure 6:
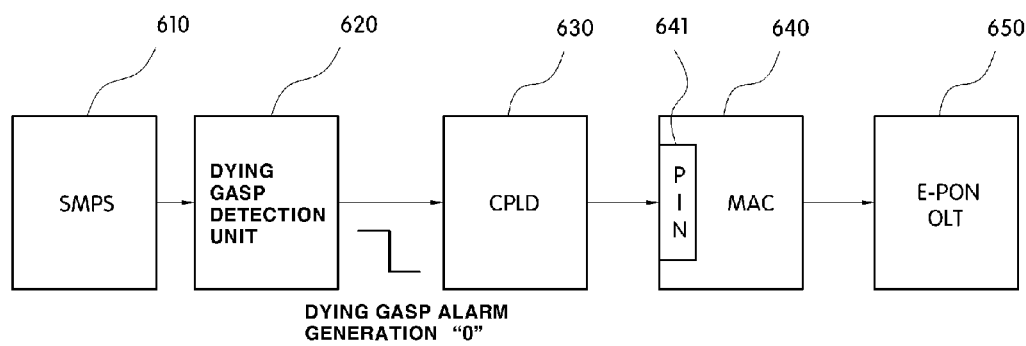
FIG. 6 is a diagram schematically showing the configuration of an Ethernet-based transmission system using a dying gasp according to a fourth embodiment of the present invention.

FIG. 6 is a diagram schematically showing the configuration of an EPON-based transmission system using a dying gasp according to a fourth embodiment of the present invention. As shown in FIG. 6, an EPON-based transmission system 600 using a dying gasp according to the present invention includes an SMPS 610, a dying gasp detection unit 620, a CPLD 630, a MAC chip 640, and an EPON OLT 650. The SMPS 610 supplies power to an EPON-based lower level system. The dying gasp detection unit 620 receives the voltage of the SMPS 610, compares the received voltage with a reference voltage, and outputs a dying gasp alarm signal if it is determined that a power fault has occurred as a result of the comparison. The CPLD 630 receives the dying gasp alarm signal from the dying gasp detection unit 620 and transfers it. The MAC chip 640 receives the dying gasp alarm signal from the CPLD 630, and generates an alarm packet. The EPON OLT 650 receives the alarm packet from the MAC chip 640, and determines whether a power fault has occurred in the lower level system.

In this case, a detailed description of the same components as those of the third embodiment will be omitted.

This embodiment corresponds to a case where the SMPS 610 does not support a dying gasp recognition signal, wherein the dying gasp detection unit 620 is separately configured in the main board of the system to implement such a function. Referring back to FIG. 4, in the dying gasp detection unit 620, the comparator logic of a voltage comparison unit 420 is implemented and configured to receive the output voltage of the SMPS and also receive a reference voltage set by a reference voltage unit 410, and to perform monitoring based on a comparison between the output voltage and the reference voltage. When the output voltage of the SMPS drops below the reference voltage while monitoring based on the comparison is being performed, the dying gasp detection unit 620 applies an alarm signal corresponding to such a voltage drop to the CPLD.

Therefore, in the present invention, a fault in the power unit of a lower level network system can be rapidly detected within a short period of time, and so an Ethernet-based CPU or an EPON ONU MAC chip for generating and transmitting an alarm packet based on the results of the detection can generate the alarm packet and transmit it to a higher level network within a possible running time.

As described above, the present invention is advantageous in that it applies a dying gasp to an Ethernet-based or EPON-based transmission system and is then capable of generating and transmitting an alarm packet so that when a power failure or a power fault occurs, a device in a higher level network can rapidly determine whether a power fault has occurred in a lower level network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the scope of the present invention should not be limited by the above-described embodiments and should be defined by the accompanying claims and equivalents thereof.

What is claimed is:

1. A transmission system using a dying gasp, the transmission system being implemented for a communication terminal connected over an Ethernet, comprising:
   a Switching Mode Power Supply (SMPS) for supplying power to an Ethernet-based lower level system, detecting a state of a power fault, and outputting a dying gasp alarm signal;
   a Central Processing Unit (CPU) for receiving the dying gasp alarm signal from the SMPS, and generating and transmitting an alarm packet;
   a Physical layer (PHY) chip for receiving the alarm packet from the CPU, and uplinking the alarm packet so that the alarm packet is transferred to a higher level network; and
   a Layer-3 (L3) switch for receiving the alarm packet from the PHY chip and determining whether a power fault has occurred in the lower level system.

2. The transmission system of claim 1, wherein the SMPS is provided with a photodiode and is configured to, when a voltage of the SMPS drops below a set voltage, turn on the photodiode and output a stably isolated dying gasp alarm signal.

3. The transmission system of claim 1, wherein the CPU comprises:
   an interrupt processing unit for generating an interrupt signal making a transition from a high level of a normal signal to a low level when the dying gasp alarm signal is received;
   a control unit for assigning priority to the interrupt signal generated by the interrupt processing unit, and outputting an alarm signal; and
   an alarm packet unit for receiving the alarm signal from the control unit and generating and transmitting an alarm packet corresponding to the alarm signal.

4. A transmission system using a dying gasp, the transmission system being implemented for a communication terminal connected to an Ethernet, comprising:
   an SMPS for supplying power to an Ethernet-based lower level system;
   a dying gasp detection unit for receiving a voltage of the SMPS, comparing the received voltage with a reference voltage, and outputting a dying gasp alarm signal if it is determined that a power fault has occurred;
   a CPU for receiving the dying gasp alarm signal from the dying gasp detection unit, and generating and transmitting an alarm packet;
   a PHY chip for receiving the alarm packet from the CPU, and uplinking the alarm packet so that the alarm packet is transferred to a higher level network; and
   an L3 switch for receiving the alarm packet from the PHY chip and determining whether a power fault has occurred in the lower level system.

5. The transmission system of claim 4, wherein the CPU comprises:
   an interrupt processing unit for generating an interrupt signal making a transition from a high level of a normal signal to a low level when the dying gasp alarm signal is received;
   a control unit for assigning priority to the interrupt signal generated by the interrupt processing unit, and outputting an alarm signal; and
   an alarm packet unit for receiving the alarm signal from the control unit and generating and transmitting an alarm packet corresponding to the alarm signal.

6. The transmission system of claim 5, wherein the alarm packet unit generates an Ethernet Operations, Administration and Maintenance (OAM) packet, a Simple Network Management Protocol (SNMP) packet, and a Syslog packet, and transmits the packets to the PHY chip operating in conjunction with the higher-level network.

7. A transmission system using a dying gasp, the transmission system being an Ethernet Passive Optical Network (EPON)-based transmission system, comprising:
   an SMPS for supplying power to an EPON-based lower level system, detecting a state of a power fault, and outputting a dying gasp alarm signal;
   a Complex Programmable Logic Device (CPLD) for receiving the dying gasp alarm signal from the SMPS and transferring the dying gasp alarm signal;
   a Media Access Control (MAC) chip for receiving the dying gasp alarm signal from the CPLD, and generating an alarm packet; and
   an EPON Optical Line Terminal (EPON OLT) for receiving the alarm packet from the MAC chip and determining whether a power fault has occurred in the lower level system.

8. The transmission system of claim 7, wherein the SMPS is provided with a photodiode and is configured to, when a voltage of the SMPS drops below a set voltage, turn on the photodiode and output a stably isolated dying gasp alarm signal.

9. The transmission system of claim 7, wherein the MAC chip receives the dying gasp alarm signal through a power fail pin and then detects whether a power fault has occurred.

10. The transmission system of claim 7, wherein the CPLD bypasses the dying gasp alarm signal to the MAC chip and inverts a dying gasp alarm signal of "0" or "1" depending on a condition of the MAC chip, or transfers the dying gasp alarm signal to the MAC chip in combination with other conditions.

11. A transmission system using a dying gasp, the transmission system being an Ethernet Passive Optical Network (EPON)-based transmission system, comprising:
   an SMPS for supplying power to an EPON-based lower level system;
   a dying gasp detection unit for receiving a voltage of the SMPS, comparing the received voltage with a reference voltage, and outputting a dying gasp alarm signal if it is determined that a power fault has occurred;
   a CPLD for receiving the gasp alarm signal from the dying gasp detection unit and transferring the dying gasp alarm signal;

a MAC chip for receiving the dying gasp alarm signal from the CPLD and generating an alarm packet; and an EPON OLT for receiving the alarm packet from the MAC chip and determining whether a power fault has occurred in the lower level system.

12. The transmission system of claim 11, wherein the MAC chip receives the dying gasp alarm signal through a power fail pin and then detects whether a power fault has occurred.

13. The transmission system of claim 11, wherein the CPLD bypasses the dying gasp alarm signal to the MAC chip and inverts a dying gasp alarm signal of "0" or "1" depending on a condition of the MAC chip, or transfers the dying gasp alarm signal to the MAC chip in combination with other conditions.

* * * * *